United States Patent
Kosugi et al.

[11] Patent Number: 5,675,446
[45] Date of Patent: Oct. 7, 1997

[54] METHOD OF CONTROLLING MAGNETIC DISK UNIT BASED ON VERSION DATA

[75] Inventors: Tatsuhiko Kosugi; Masahide Kanegae; Nobuyuki Suzuki, all of Kawasaki, Japan

[73] Assignee: Fujitsu Limited, Kawasaki, Japan

[21] Appl. No.: 353,148

[22] Filed: Dec. 9, 1994

Related U.S. Application Data

[63] Continuation of Ser. No. 38,502, Mar. 29, 1993, abandoned.

[30] Foreign Application Priority Data

Mar. 30, 1992 [JP] Japan ..................... 4-074444

[51] Int. Cl.$^6$ .................................................. G11B 5/02
[52] U.S. Cl. ........................ 360/27; 360/69; 360/77.05
[58] Field of Search .................. 360/69, 75, 77.05, 360/77.08, 97.03, 98.01, 27; 324/210, 212

[56] References Cited

U.S. PATENT DOCUMENTS

| | | | |
|---|---|---|---|
| 4,480,277 | 10/1984 | Hara et al. | 360/69 |
| 4,554,599 | 11/1985 | Shiozaki | 360/69 |
| 4,896,311 | 1/1990 | Ishihara | 360/27 X |
| 4,928,192 | 5/1990 | Bartlett et al. | 360/77.08 |
| 4,928,193 | 5/1990 | Aguglia et al. | 360/69 X |
| 5,173,816 | 12/1992 | Ogihara | 360/69 |
| 5,210,672 | 5/1993 | Ivers et al. | 360/69 X |
| 5,253,129 | 10/1993 | Blackborow et al. | 360/69 |

FOREIGN PATENT DOCUMENTS

| | | |
|---|---|---|
| 55-92914 | 7/1980 | Japan . |
| 58-10892 | 1/1983 | Japan . |
| 59-58607 | 4/1984 | Japan . |
| 6424563 | 2/1989 | Japan . |
| 64-79904 | 3/1989 | Japan . |
| 1-208706 | 8/1989 | Japan . |
| 1146394 | 10/1989 | Japan . |
| 341668 | 2/1991 | Japan . |

Primary Examiner—Andrew L. Sniezek
Attorney, Agent, or Firm—Greer, Burns & Crain, LTD.

[57] ABSTRACT

A method of controlling a magnetic disk unit. The method controls the magnetic disk unit which comprises a disk enclosure part and a printed-circuit board part. The disk enclosure part includes at least one magnetic disk, at least one magnetic head and a mechanical part for driving each magnetic disk and each magnetic head. The printed-circuit board part includes a circuit part for controlling the disk enclosure part. The method includes the steps of writing on the magnetic disk version data indicating a type of disk enclosure part after the disk enclosure part and the printed-circuit board part are assembled, and automatically setting the circuit part of the printed-circuit board part depending on the version data which is read from the magnetic disk after the magnetic disk unit is completed.

12 Claims, 7 Drawing Sheets

METHOD OF CONTROLLING MAGNETIC DISK UNIT BASED ON VERSION DATA

RELATED APPLICATION

This is a continuation of application Ser. No. 08/038,502, filed on Mar. 29, 1993 now abandoned.

BACKGROUND OF THE INVENTION

The present invention generally relates to methods of controlling magnetic disk units, and more particularly to a method of controlling a magnetic disk unit which is made up of a disk enclosure part and a printed-circuit board part.

A magnetic disk unit is generally made up of a disk enclosure part and a printed-circuit board part which form a drive module. The disk enclosure part includes a disk and mechanical parts such as a head and a motor. On the other hand, the printed-circuit board part includes circuits for controlling the disk enclosure part. A large magnetic disk unit includes a plurality of such drive modules, and a printed-circuit board which controls the drive modules.

The maintenance of the large magnetic disk units is made for each disk enclosure part and each printed-circuit board part. However, even among the magnetic disk units of the same type or model, there are various versions to the disk enclosure part and the printed-circuit board part. For this reason, normal operation of the magnetic disk unit cannot be expected, depending on the combination of the disk enclosure part and the printed-circuit board part. Conventionally, a dip switch is provided on the printed-circuit board part, and the setting of the printed-circuit board part is appropriately switched by the dip switch depending on the combination of the disk enclosure part and the printed-circuit board part, so that the normal operation of the combination is guaranteed.

Conventionally, the operator must check the version of the disk enclosure part in order to determine the setting of the printed-circuit board part which is to be used in combination with this disk enclosure part. Then, the Operator manipulates the dip switch depending on the version of the disk enclosure part. But when making this setting, there was a problem in that the operator may erroneously manipulate the dip switch, thereby resulting in an erroneous setting.

On the other hand, a read/write circuit of the printed-circuit board part uses a delay circuit, and the delay time of this delay circuit is determined by a pole length which is the length of the write part along a direction in which the head of the disk enclosure part moves. However, this pole length differs for each individual head due to errors introduced during the production of the heads. For this reason, to be accurate the delay time of the delay circuit must be adjusted for each head, but conventionally, the delay time is not adjusted to an optimum value to suit each individual head. Consequently, there is a problem in that the data can not be read normally from the disk if the fixed delay time does not suit the head with a particular production error, and in this case, the production yield of the magnetic disk unit deteriorates.

SUMMARY OF THE INVENTION

Accordingly, it is a general object of the present invention to provide a novel and useful method of controlling the magnetic disk unit in which the problems described above are eliminated.

Another and more specific object of the present invention is to provide a method of controlling a magnetic disk unit which comprises a disk enclosure part and a printed-circuit board part, where the disk enclosure part includes at least one magnetic disk, at least one magnetic head and a mechanical part for driving each magnetic disk and each magnetic head, the printed-circuit board part includes a circuit part for controlling the disk enclosure part, and the method comprises the steps of (a) writing on the magnetic disk version data indicating a type of the disk enclosure part after the disk enclosure part and the printed-circuit board part are assembled, and (b) automatically setting the circuit part of the printed-circuit board part depending on the version data which is read from the magnetic disk after the magnetic disk unit is completed. According to the method of the present invention, the setting of the circuit part of the printed-circuit board part is made automatically depending on the version of the disk enclosure part. For this reason, there is no possibility of making an erroneous setting of the circuit part of the printed-circuit board part. In addition, it is also possible to automatically set a delay time of a read circuit within the circuit part to an optimum delay time to suit each magnetic head. Therefore, it is possible to considerably improve the production yield of the magnetic disk unit.

Other objects and further features of the present invention will be apparent from the following detailed description when read in conjunction with the accompanying drawings.

DESCRIPTION OF THE PREFERRED EMBODIMENTS

First, a description will be given of a magnetic disk unit to which an embodiment of a method of controlling the magnetic disk unit according to the present invention may be applied, by referring to FIG. 1.

Figure 1:
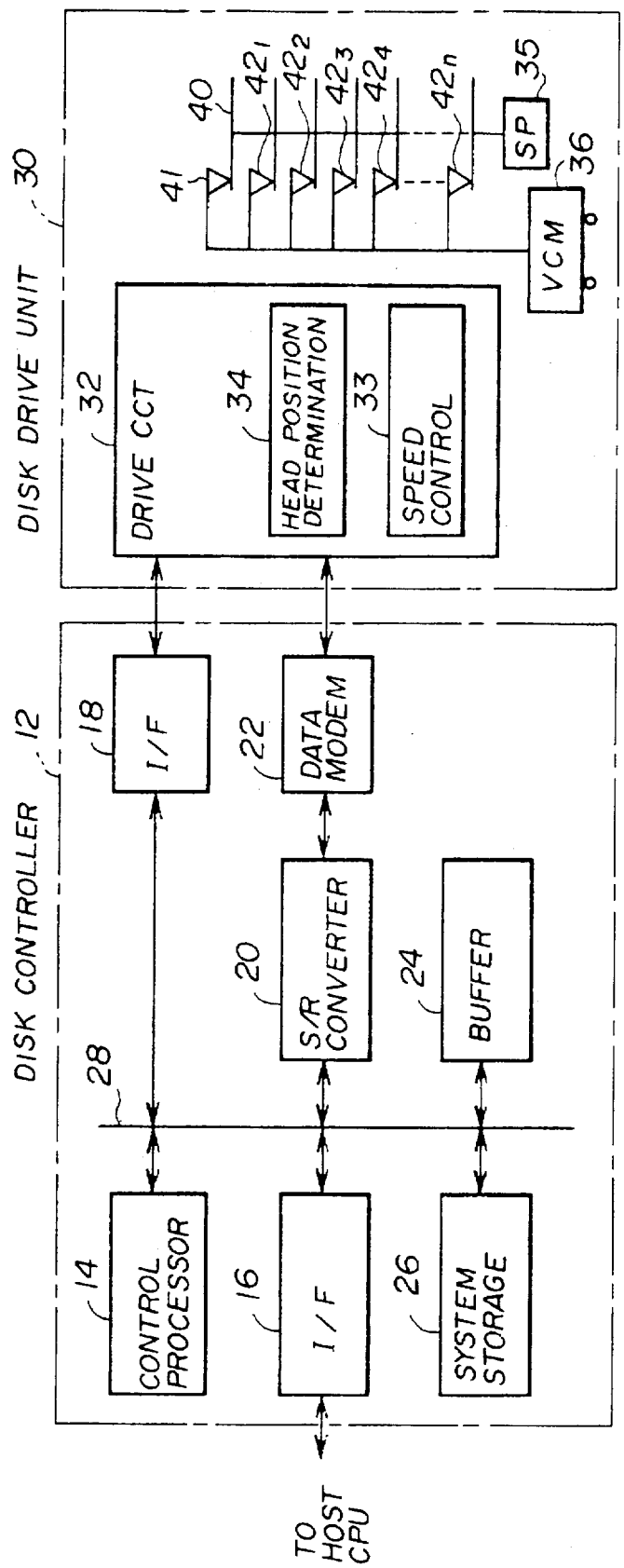
FIG. 1 is a system block diagram showing an essential part of a magnetic disk unit to which an embodiment of a method of controlling the magnetic disk unit according to the present invention is applied.

The magnetic disk unit shown in FIG. 1 generally includes a disk controller 12 and a disk drive unit 30.

The disk controller 12 includes a control processor 14, an interface 16, a drive interface 18, a serial-to-parallel (S/P) converter 20, a data modem 22, a data transfer buffer 24 and a system storage 26. The control processor 14, the interface 16, the drive interface 18, the S/P converter 20, the data transfer buffer 24 and the system storage 26 are coupled via an internal bus 28.

On the other hand, the disk drive unit 30 includes a drive circuit 32, a spindle motor 35, a voice coil motor 36, and a plurality of heads 41 and $42_1$ through $42_n$ which are provided with respect to each of a plurality of magnetic disks 40. The drive circuit 32 includes a head position determination circuit 34 and a rotational speed control circuit 33.

In the disk controller 12, the control processor 14 controls the general operation of the entire disk controller 12. The interface 16 couples the disk controller 12 to a host unit (not shown) such as a central processing unit (CPU). The drive interface 18 transmits control commands from the control processor 14 to the disk drive unit 30. The S/P converter 20 exchanges write data and read data with the disk drive unit 30 via the data modem 22. The S/P converter 20 and the data modem 22 normally form a VFO part. The write data and the read data are temporarily stored in the data transfer buffer 24 before being transmitted to the disk drive unit 30 and the host unit.

The drive circuit 32 of the disk drive unit 30 forms the printed-circuit board part. The rotational speed control circuit 33 within the drive circuit 32 rotates the magnetic disks 40 at a constant rotational speed by the spindle motor 35. In addition, the head position determination circuit 34 within the drive circuit 32 drives the voice coil motor 36 so as to move a head actuator which has n+1 arms. The heads 41 and $42_1$ through $42_n$ are provided on respective ends of the arms of the actuator. As a result, the heads 41 and $42_1$ through $42_n$ move approximately in the radial direction of the corresponding disks 40.

For example, the head 41 is used to read servo information, and the heads $42_1$ through $42_n$ are used to write and read data. In this case, the top disk 40 is used as a servo disk which stores servo information in all cylinder positions (that is, all track positions) of the servo surface, and the remaining disks 40 are used as data disks.

Figure 2:
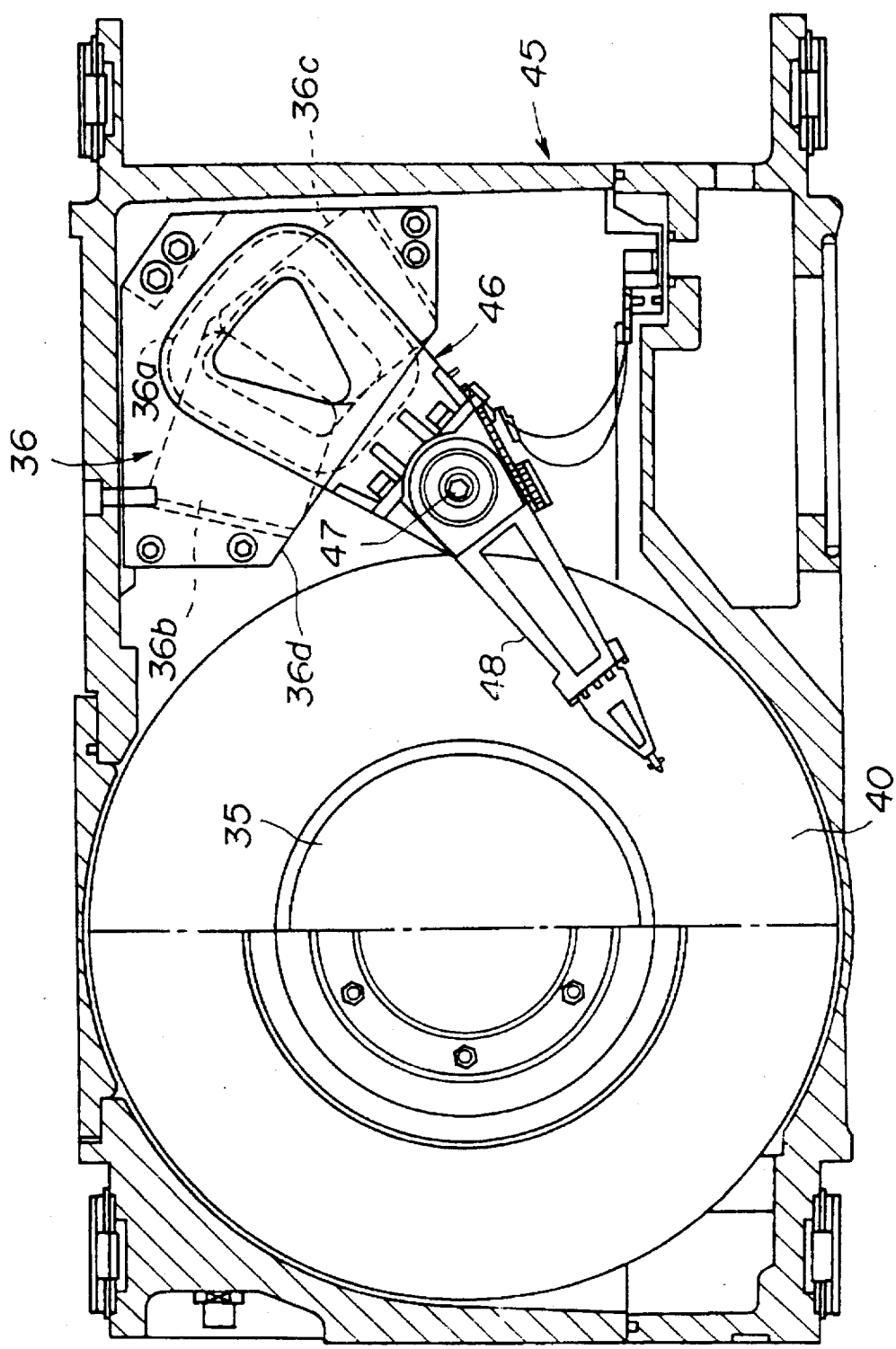
FIG. 2 is a plan view, with a part omitted, showing a disk enclosure part shown in FIG. 1.
Figure 3:
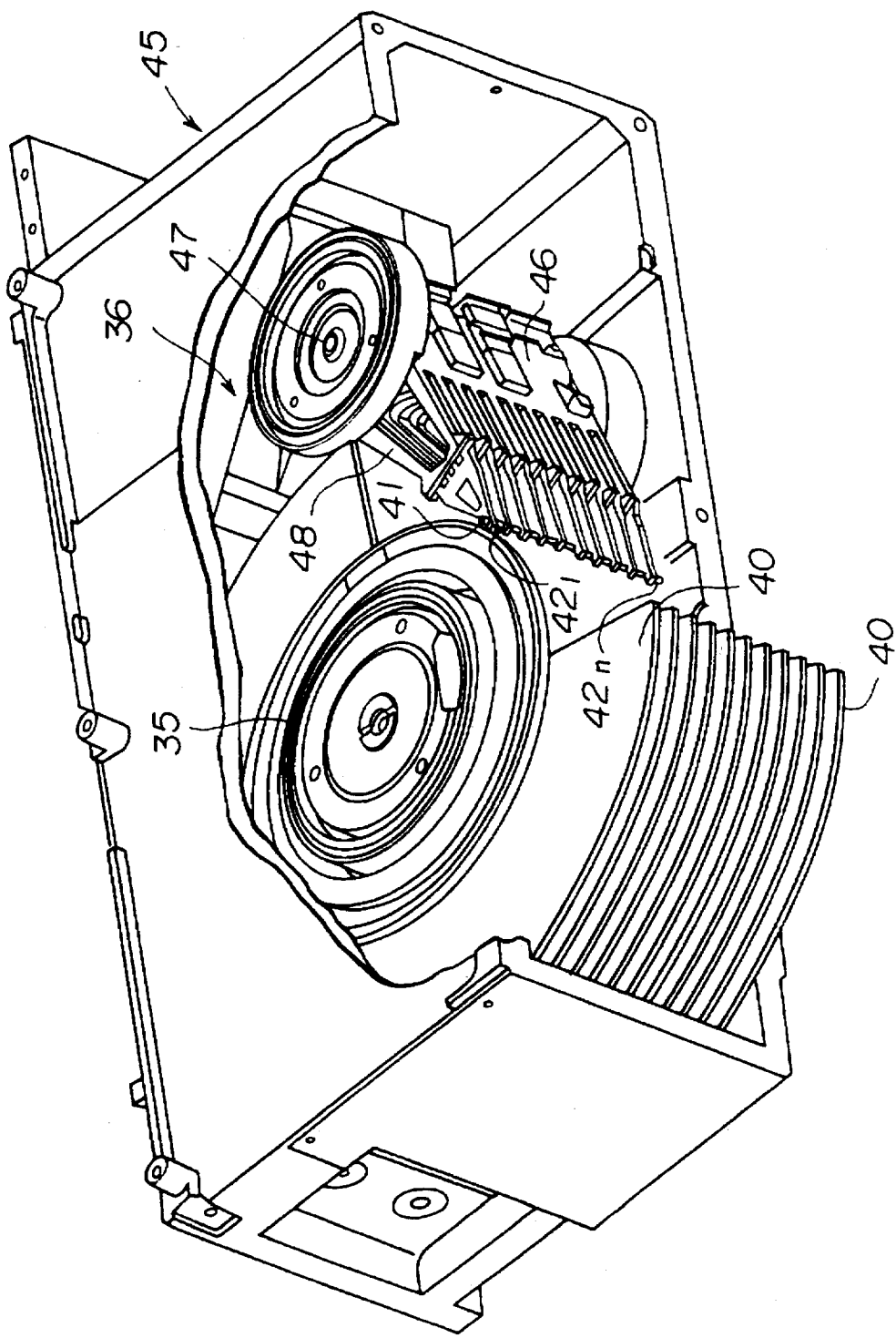
FIG. 3 is a perspective view, with a part omitted, showing the disk enclosure part.

FIG. 2 shows a plan view of a disk enclosure part of the magnetic disk unit shown in FIG. 1 with a part omitted, and FIG. 3 shows a perspective view of this disk enclosure part with a part omitted.

As shown in FIGS. 2 and 3, 11 magnetic disks 40 are accommodated within a disk enclosure 45, and these magnetic disks 40 are rotated by the spindle motor 35. A head actuator 46 is rotated about a shaft 47 by the voice coil motor 36, and thus, the heads 41 and $42_1$ through $42_n$ which are provided on the respective ends of the arms of the head actuator 46 move approximately in the radial direction of the corresponding magnetic disks 40. As shown in FIG. 2, the voice coil motor 36 includes a coil 36a, permanent magnets 36b and 36c, and a yoke 36c.

Figure 4:
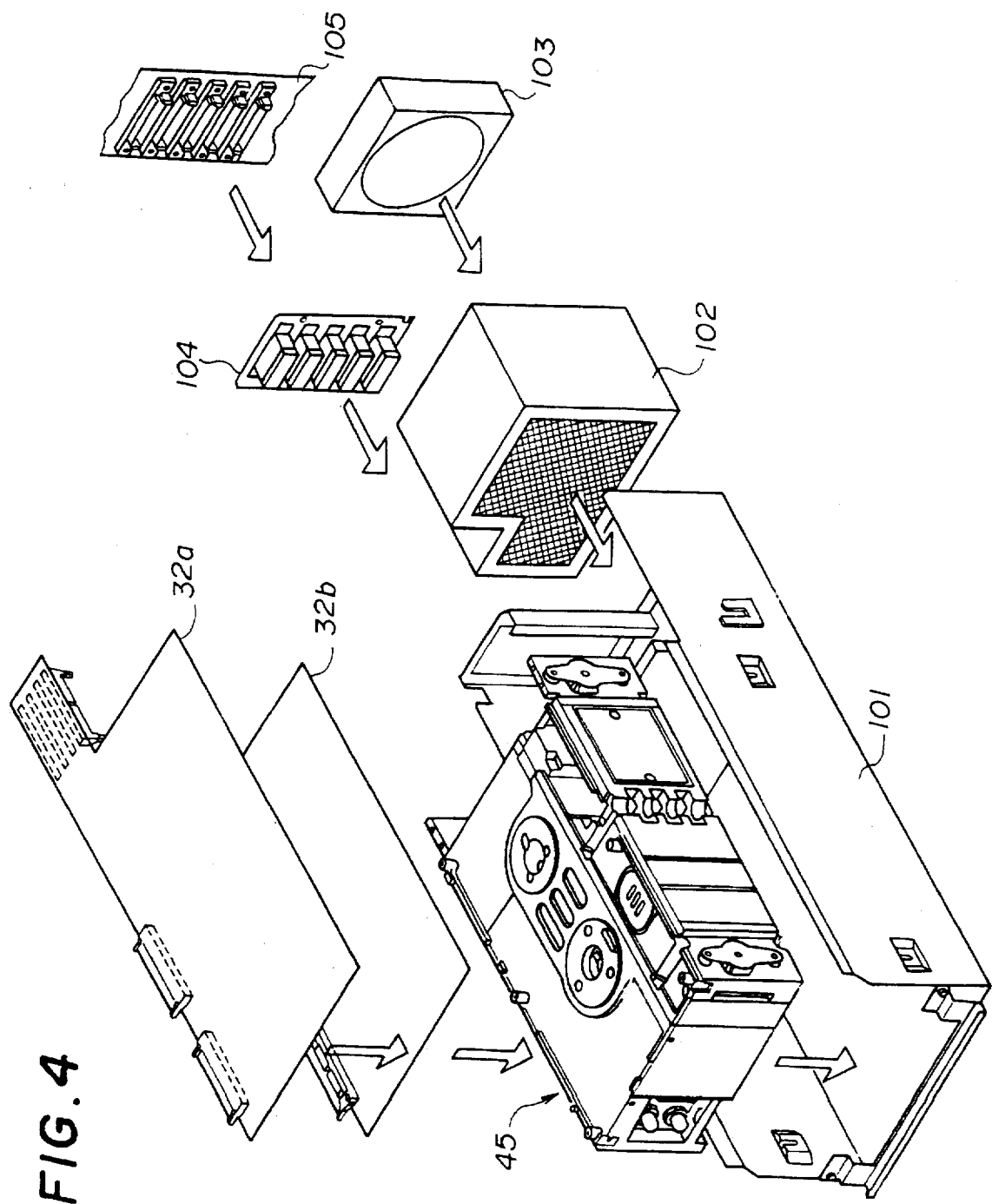
FIG. 4 is a disassembled perspective view showing the magnetic disk unit shown in FIG. 1.

FIG. 4 shows a disassembled perspective view of the magnetic disk unit shown in FIG. 1. As shown in FIG. 4, the disk enclosure 45 is mounted on a housing 101, and printed circuit boards 32a and 32b which form the printed-circuit board part are mounted on the disk enclosure 45. The printed circuit boards 32a and 32b correspond to the drive circuit 32 shown in FIG. 1. A power unit 102 for supplying power to the disk enclosure 45 is mounted on the housing 100, and a cooling unit 103 is mounted on the power unit 102. In addition, interface connectors 104 and 105 are connected to the disk enclosure 45.

Figure 5:
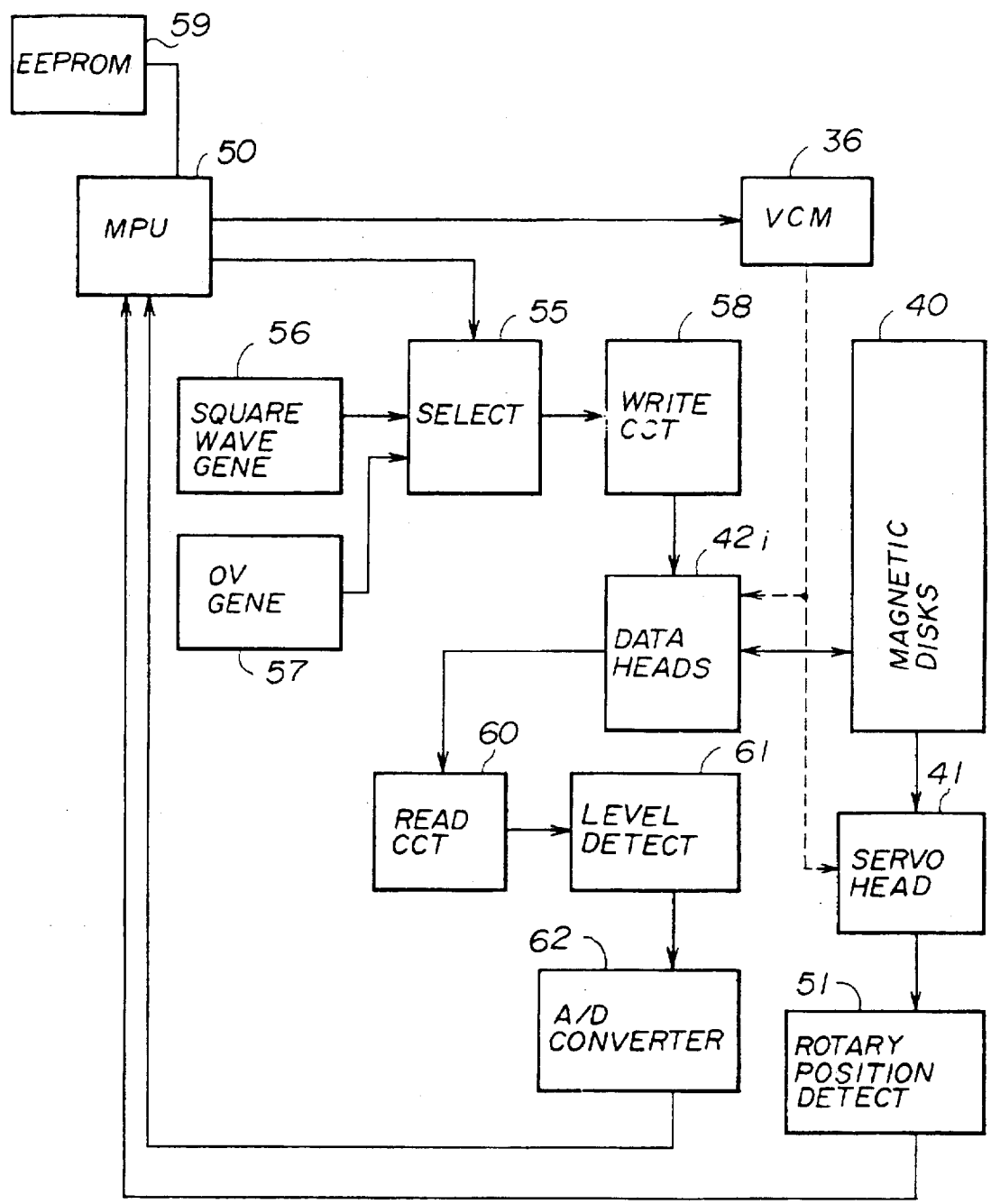
FIG. 5 is a system block diagram showing a first embodiment of a head position determination circuit.
Figure 6:
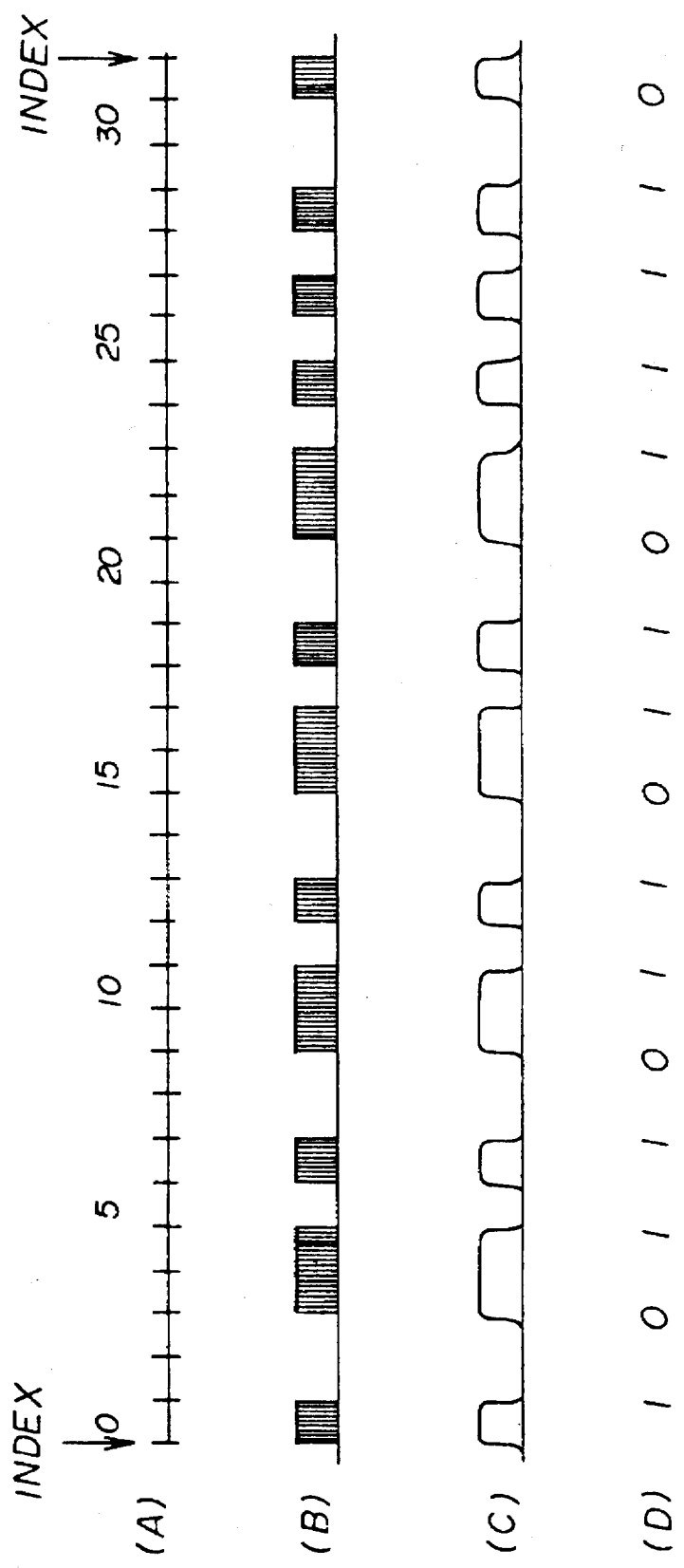
FIG. 6 is a time chart for explaining the operation of the first embodiment of the head position determination circuit.

Next, a description will be given of a first embodiment of the head position determination circuit 34 used in this embodiment of the method, by referring to FIGS. 5 and 6. FIG. 5 shows the first embodiment of the head position determination circuit 34 together with the voice coil motor 36, the heads 41 and 42i and the magnetic disks 40, where i=1, ..., n. FIG. 6 is a time chart for explaining the operation of the first embodiment of the head position determination circuit 34. In FIG. 5, those parts which are the same as those corresponding parts in FIG. 1 are designated by the same reference numerals, and a description thereof will be omitted.

After the disk enclosure part and the printed-circuit board part are assembled, a servo microprocessor unit (MPU) 50 drives the voice coil motor 36 so as to move the heads 41 and 42i to a cylinder of the magnetic disks 40 where the version number is to be written, where i=1, ..., n. The servo head 41 reads a servo pattern on the servo surface of the magnetic disk 40. A rotary position detection circuit 51 detects a rotary position of the magnetic disk 40 based on the signal read by the servo head 41, and supplies to the MPU 50 a detection signal related to the detected rotary position. As shown in FIG. 6 (A), this detection signal is detected at 32 equiangular positions in one revolution of the disk 40.

The MPU 50 switches a selection circuit 55 depending on the version data which indicates the type of disk enclosure part based on the detection signal related to the rotary position, so that the 0 V generated from a 0 V generation circuit 56 or a square wave generated from a square wave generation circuit 57 is selectively output from the switching circuit 55. The output signal of the selection circuit 55 is shown in FIG. 6 (B). This output signal of the selection circuit 55 is amplified in a write circuit 58 and is supplied to the data heads 42i so as to write the servo pattern on the data surface of the magnetic disks 40.

The version data is made up of a control number and a serial number of the disk enclosure part, and is supplied to the MPU 50 from a tester (not shown) for example. The control number indicates the type of motor, the type of head, the type of magnetic disk and the like. On the other hand, the serial number indicates the production order of the disk enclosure part and takes a sequential value. The MPU 50 decomposes the version data into bits, and 1 bit of the version number is written by writing the square wave at an even numbered rotary position or the odd numbered rotary position which is obtained by adding 1 to the even numbered rotary position, for each of the 32 rotary positions starting from the index position of the magnetic disk 40. In FIG. 6 (A), the 32 rotary positions are numbered from "0" to "31". For example, the bit indicates "1" as shown in FIG. 6 (D) if the square wave is written at the rotary position number "0" out of the rotary position numbers "0" and "1", and the bit indicates "0" as shown in FIG. 6 (D) if the square wave is written at the rotary position number "3" out of the rotary position numbers "2" and "3". Hence, it is possible to write a 16-bit version data on one surface of the magnetic disk 40 for one revolution of the magnetic disk 40.

When turning the power ON for the first time after the production of the magnetic disk unit, that is, after completion of the magnetic disk unit, the data head 42i reads the data surface of the magnetic disk 40 in a state where the data head 42i is on the track of the cylinder written with the version data. A read signal from the data heads 42i is supplied to a level detection circuit 61 via a read circuit 60. The level detection circuit 81 detects the level of the read signal and outputs a signal shown in FIG. 6 (C). This output signal of the level detection circuit 61 is converted into a digital signal in an analog-to-digital (A/D) converter circuit 62, and the digital signal is supplied to the MPU 50. The MPU 50 reads the version data based on the rotary position detected by the rotary position detection circuit 51, and generates control data for setting various parts within the drive circuit 32, that is, the printed-circuit board part. The MPU 50 writes the control data into a non-volatile memory 59 such as an electrically erasable programmable read only memory (EEPROM). Thereafter, the various parts within the drive circuit 32 are set based on the control data stored in the non-volatile memory 59.

Of course, it is not essential to provide the non-volatile memory 59. In other words, the control data may be generated by reading the version data every time the power is turned ON.

Figure 7:
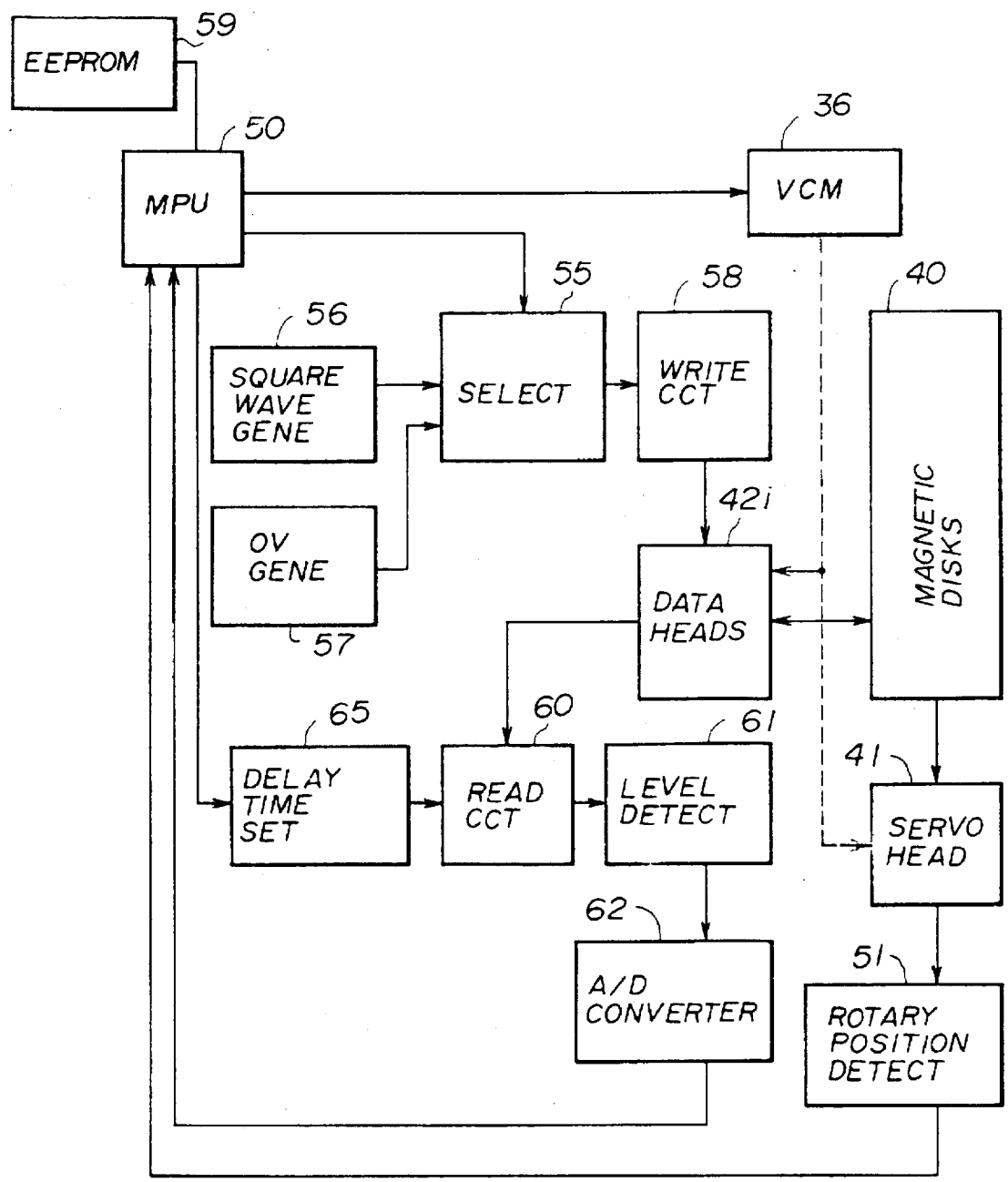
FIG. 7 is a system block diagram showing a second embodiment of the head position determination circuit.

Next, a description will be given of a second embodiment of the head position determination circuit 34 used in this embodiment of the method, by referring to FIG. 7. In FIG. 7, those parts which are the same as those corresponding parts in FIG. 5 are designated by the same reference numerals, and a description thereof will be omitted.

In this second embodiment of the head position determination circuit 34 shown in FIG. 7, a delay time which makes the read and write error rate a minimum is obtained by a tester (not shown) after the disk enclosure part and the printed-circuit board part are assembled.

In other words, a delay time setting circuit 65 can set m kinds of mutually different delay times with respect to the read circuit 60. The delay time setting circuit 65 is instructed from the tester via the MPU 50 so as to successively set each delay time. The margin of the read circuit 60 is such that the normal data transfer speed of the read and write in the magnetic disk unit is several Mbits/sec and the MPU 50 of the head position determination circuit 34 cannot carry out such a high speed data processing. However, because the version data is written and read in the form of the square wave, that is, as the existence and non-existence of the square wave, it is possible to process the version data even in the MPU 50. As a result, it becomes unnecessary for the operator to manipulate the dip switch, and the possibility of the operator making an erroneous setting is eliminated.

The range of the threshold value which enables reading of the values "1" and "0" by the read circuit 6 0 is measured by the tester, and the kind of delay time is obtained for the measured margin which is a maximum. This kind of delay time which is obtained is added to the version data as the delay data and written into the magnetic disk 40.

When the power is turned ON after the production of the magnetic disk unit, the MPU 50 instructs the kind of delay time which is to be set by the delay time setting circuit 65 depending on the delay data which is read from the magnetic disk 40 together with the version data.

Accordingly, the delay time of the read circuit 60 is adjusted to an optimum value, and an error-free data read can be made, thereby making it possible to improve the production yield of the magnetic disk unit.

The above described operation is carried out for all of the magnetic heads 42i, where i=1, . . . , n, so that the delay time is set to the optimum delay time for each magnetic head 42i. In other words, it is possible to adjust the delay time independently for each magnetic head 42i.

Since the delay data is written and read in the same format as the version data, the recording density of the delay data on the magnetic disk 40 is smaller than that of the normal read data by 3 digits. But even if the delay time of the read circuit 60 at the time of reading the version data and the delay data after the power is turned ON is not set to the optimum value, the delay data can be read without any problems because the delay data is written as the existence and non-existence of the square wave.

Further, the present invention is not limited to these embodiments, but various variations and modifications may be made without departing from the scope of the present invention.

What is claimed is:

1. A method of controlling a magnetic disk unit which comprises a disk enclosure part and a printed-circuit board part, said disk enclosure part including at least one magnetic disk, at least one magnetic head and a mechanical part for driving each magnetic disk and each magnetic head, said printed-circuit board part including a circuit part for controlling the disk enclosure part, said method comprising the steps of:

writing version data indicating a type of the disk enclosure part after the disk enclosure part and the printed-circuit board part are assembled; and (b) automatically setting the circuit part of the printed-circuit board part depending on the version data which is read from the magnetic disk after the magnetic disk unit is completed;

wherein said step (b) includes setting a delay time of a read circuit within the circuit part of the printed-circuit board part.

2. The method of controlling the magnetic disk unit as claimed in claim 1, wherein said step (a) writes the version data in a square wave form.

3. A method of controlling a magnetic disk unit which comprises a disk enclosure part and a printed-circuit board part, said disk enclosure part including at least one magnetic disk, at least one magnetic head and a mechanical part for driving each magnetic disk and each magnetic head, said printed circuit board part including a circuit part for controlling the disk enclosure part, said method comprising the steps of:

(a) writing version data indicating a type of the disk enclosure part after the disk enclosure part and the printed-circuit board part are assembled; and (b) automatically setting the circuit part of the printed-circuit board part depending on the version data which is read from the magnetic disk after the magnetic disk unit is completed;

wherein said step (a) includes writing delay data on the magnetic disk indicating a delay time of a read circuit within the circuit part of the printed-circuit board part together with the version data, said step (b) includes setting the delay time of the read circuit within the circuit part of the printed-circuit board part to an optimum delay time depending on the delay data read from the magnetic disk.

4. The method of controlling the magnetic disk unit as claimed in claim 3, wherein said step (a) obtains the delay time by measuring the optimum delay time of the read circuit within the circuit part of the printed-circuit board part after the disk enclosure part and the printed-circuit board part are assembled.

5. The method of controlling the magnetic disk unit as claimed in claim 3, wherein the disk enclosure part includes a plurality of magnetic disks and a plurality of magnetic heads, and said step (b) sets the delay time independently for each of the magnetic heads.

6. The method of controlling the magnetic disk unit as claimed in claim 5, which further comprises the step of:

(c) detecting a rotary position on the magnetic disk by reading a servo pattern from one of the magnetic disks by one of the magnetic heads, said step (a) writing the version data on the magnetic disk in response to the rotary position detected by said step (c).

7. A method of controlling a magnetic disk unit which comprises a disk enclosure part and a printed-circuit board part, the disk enclosure part including at least one magnetic disk, at least one magnetic head and a mechanical part for driving each magnetic disk and each magnetic head, said printed-circuit board part including a circuit part for controlling the disk enclosure part, said method comprising the steps of:

(a) assembling the disk enclosure part and the printed-circuit board part;

(b) after said step (a) and prior to optimization and setting of circuit parameters of the printed circuit board part, writing version data indicating a type of the disk enclosure part onto said magnetic disk, said version data including a control number and a serial number of the disk enclosure part;

(c) reading the version data which was written during step (b); and (d) setting the parameters of the circuit part of the printed-circuit board part necessary for controlling the magnetic disk unit, including setting a delay time of the read circuit within the circuit part of the printed-circuit board part, wherein each of said steps (a)–(d) is performed during the production of the magnetic disk unit.

8. The method of controlling the magnetic disk unit as claimed in claim 7, wherein said step (b) writes the version data in a square waveform.

9. A method of controlling a magnetic disk unit which comprises a disk enclosure part and a printed-circuit board part, the disk enclosure part including at least one magnetic disk, at least one magnetic head and a mechanical part for driving each magnetic disk and each magnetic head, said printed-circuit board part including a circuit part for controlling the disk enclosure part, said method comprising the steps of:

(a) assembling the disk enclosure part and the printed-circuit board part;

(b) after said step (a) and prior to optimization and setting of circuit parameters of the printed circuit board part, writing version data indicating a type of the disk enclosure part onto said magnetic disk, said version data including a control number and a serial number of the disk enclosure part, wherein writing said version data includes writing delay data on the magnetic disk indicating a delay time of a read circuit within the circuit part of the printed-circuit board part together with the version data;

(c) reading the version data which was written during step (b); and (d) setting the parameters of the circuit part of the printed-circuit board part necessary for controlling the magnetic disk unit, including setting the delay time of the read circuit within the circuit part of the printed-circuit board part to an optimum delay time, said optimum delay time depending on the delay data read from the magnetic disk, wherein each of said steps (a)–(d) is performed during the production of the magnetic disk unit.

10. The method of controlling the magnetic disk unit as claimed in claim 9, wherein said step (b) obtains the delay time by measuring the optimum delay time of the read circuit within the circuit part of the printed-circuit board part after the disk enclosure part and the printed-circuit board part are assembled.

11. The method of controlling the magnetic disk unit as claimed in claim 9, wherein the disk enclosure part includes a plurality of magnetic disks and a plurality of magnetic heads, and said step (d) sets the delay time independently for each of the magnetic heads.

12. The method of controlling the magnetic disk unit as claimed in claim 11, which further comprises the step of:

(e) detecting a rotary position on the magnetic disk by reading a servo pattern from one of the magnetic disks by one of the magnetic heads, said step (b) writing the version data in the magnetic disk in response to the rotary position detected by said step (e).

* * * * *

UNITED STATES PATENT AND TRADEMARK OFFICE
CERTIFICATE OF CORRECTION

PATENT NO. : 5,675,446  
DATED : October 7, 1997  
INVENTOR(S) : Kosugi et al.

It is certified that error appears in the above-identified patent and that said Letters Patent is hereby corrected as shown below:

Column 1, line 30, delete "on-the" and insert --on the-- therefor.

Column 1, line 39, delete "the Operator" and insert --the operator-- therefor.

Column 6, line 10, delete "writing" and insert --(a) writing-- therefor.

UNITED STATES PATENT AND TRADEMARK OFFICE
CERTIFICATE OF CORRECTION

PATENT NO. : 5,675,446
DATED : October 7, 1997
INVENTOR(S) : Kosugi et al.

It is certified that error appears in the above-identified patent and that said Letters Patent is hereby corrected as shown below:

Column 6, line 42, delete "said step" and insert --and said step-- therefor.

Column 7, line 19, delete "of the" and insert --of a-- therefor.

Signed and Sealed this

Eleventh Day of August 1998

Attest:

Attesting Officer

BRUCE LEHMAN

Commissioner of Patents and Trademarks